(12) United States Patent
Kim et al.

(10) Patent No.: US 11,454,388 B2
(45) Date of Patent: Sep. 27, 2022

(54) REFRIGERATOR

(71) Applicant: Samsung Electronics Co., Ltd., Suwon-si (KR)

(72) Inventors: Chun Seong Kim, Suwon-si (KR); Byoung Woo Ko, Suwon-si (KR); Jung Kwon Kim, Suwon-si (KR); Gwang Jin Jung, Suwon-si (KR); Jeong Su Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/413,498

(22) PCT Filed: Nov. 7, 2019

(86) PCT No.: PCT/KR2019/015101
§ 371 (c)(1),
(2) Date: Jun. 11, 2021

(87) PCT Pub. No.: WO2020/122431
PCT Pub. Date: Jun. 18, 2020

(65) Prior Publication Data
US 2022/0049845 A1 Feb. 17, 2022

(30) Foreign Application Priority Data

Dec. 11, 2018 (KR) .................. 10-2018-0158756

(51) Int. Cl.
*F21V 33/00* (2006.01)
*F21V 3/04* (2018.01)
(Continued)

(52) U.S. Cl.
CPC ............ *F21V 33/0044* (2013.01); *F21V 3/04* (2013.01); *F21V 11/16* (2013.01); *F25D 27/00* (2013.01);
(Continued)

(58) Field of Classification Search
CPC ........ F21V 33/0044; F21V 3/04; F21V 11/16; F25D 27/00; G02B 6/0065; F21Y 2115/10; F21W 2131/305
See application file for complete search history.

(56) References Cited

U.S. PATENT DOCUMENTS

| 2013/0027906 A1 | 1/2013 | Ueda et al. |
| 2013/0128494 A1 | 5/2013 | Seo et al. |
| (Continued) | | |

FOREIGN PATENT DOCUMENTS

| JP | 2011-179780 A | 9/2011 |
| JP | 2013-019657 A | 1/2013 |
| (Continued) | | |

OTHER PUBLICATIONS

International Search Report dated Mar. 10, 2020 in connection with International Patent Application No. PCT/KR2019/015101, 2 pages.
(Continued)

*Primary Examiner* — Andrew J Coughlin
*Assistant Examiner* — Jessica M Apenteng

(57) ABSTRACT

The present disclosure relates to a refrigerator with an improved lighting structure.

The refrigerator includes a main body in which a storage compartment is formed, a light source provided on an inner surface of the storage compartment to provide light, and a lighting cover provided to cover the light source, wherein the lighting cover includes a first opening formed to irradiate light in a direction perpendicular to the inner surface of the storage compartment, and a second opening formed to be inclined with respect to the inner surface so that light is irradiated to the front of the storage compartment.

10 Claims, 16 Drawing Sheets

(51) Int. Cl.
    *F21V 11/16*     (2006.01)
    *F25D 27/00*     (2006.01)
    *F21V 8/00*     (2006.01)
    *F21Y 115/10*     (2016.01)
    *F21W 131/305*     (2006.01)

(52) U.S. Cl.
    CPC ..... *G02B 6/0065* (2013.01); *F21W 2131/305* (2013.01); *F21Y 2115/10* (2016.08)

(56) References Cited

U.S. PATENT DOCUMENTS

2014/0268647 A1\*   9/2014   Blondin .................. F21V 29/90
                                                                           362/92
2019/0339003 A1\*   11/2019   Signorino ............... F25D 23/06

FOREIGN PATENT DOCUMENTS

| KR | 10-0187764 B1 | 6/1999 |
|---|---|---|
| KR | 10-2001-0036856 A | 5/2001 |
| KR | 10-2007-0049359 A | 5/2007 |
| KR | 20-2014-0005157 U | 10/2014 |
| KR | 10-2016-0050526 A | 5/2016 |

OTHER PUBLICATIONS

Written Opinion of the International Searching Authority dated Mar. 10, 2020 in connection with International Patent Application No. PCT/KR2019/015101, 5 pages.

\* cited by examiner

REFRIGERATOR

CROSS-REFERENCE TO RELATED APPLICATIONS

This application is a 371 of International Application No. PCT/KR2019/015101 filed on Nov. 7, 2019, which claims priority to Korean Patent Application No. 10-2018-0158756 filed on Dec. 11, 2018, the disclosures of which are herein incorporated by reference in their entirety.

BACKGROUND

1. Field

The present disclosure relates to a refrigerator, and more particularly, to a refrigerator with an improved lighting structure.

2. Description of Related Art

In general, a refrigerator is an appliance that keeps food fresh by including a main body, a door, a storage compartment formed between the main body and the door to store the food, and a cold air supply system for supplying cold air to the storage compartment. The storage compartment includes a refrigerating compartment that is maintained at temperature of about 0 degrees Celsius to 5 degrees Celsius to keep food refrigerated, and a freezing compartment that is maintained at temperature of about 0 degrees Celsius to −30 degrees Celsius to keep food frozen.

In general, the freezing compartment and the refrigerating compartment of a refrigerator are provided with a plurality of shelves that divide the storage compartment of the refrigerator up and down in order to accommodate foods of various sizes and increase space utilization.

Because the storage compartment of such a refrigerator is dark, a lighting may be provided in an inside space of the storage compartment in order for a user to easily find the stored food.

When the user opens a refrigerator door or a storage compartment door, the lighting is turned on so that the user may check the food stored in the storage compartment. In this case, when light is directly irradiated to the user, it may cause an unpleasant feeling by generating glare to the user.

The present disclosure is directed to providing a refrigerator with an improved lighting structure.

The present disclosure is directed to providing a refrigerator capable of reducing an unpleasant feeling of a user due to glare or the like that occurs when light is directly transmitted to the user.

The present disclosure is directed to providing a refrigerator in which a user may intuitively check that a lighting is in an operating state by using a main light and an auxiliary light of a light source.

SUMMARY

An aspect of the present disclosure provides a refrigerator including a main body in which a storage compartment is formed, a light source provided on an inner surface of the storage compartment to provide light, and a lighting cover provided to cover the light source, wherein the lighting cover includes a first opening formed to irradiate light in a direction perpendicular to the inner surface of the storage compartment, and a second opening formed to be inclined with respect to the inner surface so that light is irradiated to the front of the storage compartment.

The refrigerator may further include a transmission member provided to transmit light of the light source between the light source and the lighting cover.

The transmission member may be integrally formed to cover a first opening and a second opening of the lighting cover.

The transmission member may include a first region provided to cover the first opening, and a second region disposed at an edge of the first region and provided to cover the second opening, and the first region and the second region may be integrally formed.

The transmission member may include at least one of an opaque white colored polymer material with a high reflectivity, a whole transmission material, and a diffusion material.

The transmission member may include a material capable of transmitting, diffusing, and totally reflecting light.

The transmission member may be formed with the lighting cover by at least one method of double injection of different materials, insert injection, and fusion.

The lighting cover may include a blocking part protruding from an inner surface of the storage compartment so that the second opening is formed, and the blocking part may be formed to be inclined toward the rear of the storage compartment so that light is not irradiated to the front of the storage compartment.

The blocking part may be formed on the lighting cover by at least one method of ink, decoration film adhesion, and insert injection.

The second opening may include at least one of a slit and a hole.

One or more of the first and second openings may be provided.

The light source may include at least one LED and a printed circuit board (PCB) on which the at least one LED is mounted, and at least a portion of the printed circuit board may be seated on the transmission member.

The refrigerator may further include a lighting case coupled to the lighting cover or an outer side of the inner surface of the storage compartment to surround the light source and the transmission member.

Another aspect of the present disclosure provides a refrigerator including a main body in which a storage compartment is formed, a light source disposed at an inner upper surface of the storage compartment to provide light, and a lighting cover provided to cover the light source, wherein the lighting cover includes a first opening formed to irradiate light in a first direction perpendicular to the upper surface of the storage compartment, and a second opening formed to irradiate light in a second direction parallel to a front surface of the storage compartment.

The refrigerator may further include a transmission member provided to cover the first opening and the second opening to transmit light of the light source.

The transmission member may include a first region provided to cover the first opening, and a second region disposed at an edge of the first region and provided to cover the second opening, and the first region and the second region may be integrally formed.

The transmission member may include at least one of an opaque white colored polymer material with a high reflectivity, a whole transmission material, and a diffusion material.

The lighting cover may include a blocking part protruding from an inner surface of the storage compartment so that the second opening is formed, and the blocking part may be formed to be inclined toward the rear of the storage compartment so that light is not irradiated to the front of the storage compartment.

The blocking part may be formed on the lighting cover by at least one method of ink, decoration film adhesion, and insert injection.

One or more of the first and second openings may be provided.

According to an embodiment of the present disclosure, an unpleasant feeling of a user due to glare or the like that occurs when light is directly irradiated to the user can be reduced by improving a lighting device.

Further, because the user can intuitively check that a lighting is in an operating state by using a main light and an auxiliary light of a light source, user convenience can be improved.

Further, because LEDs can be arranged on a small-sized PCB, the size of the lighting device can be reduced, thereby reducing cost.

DETAILED DESCRIPTION

Figure 1:
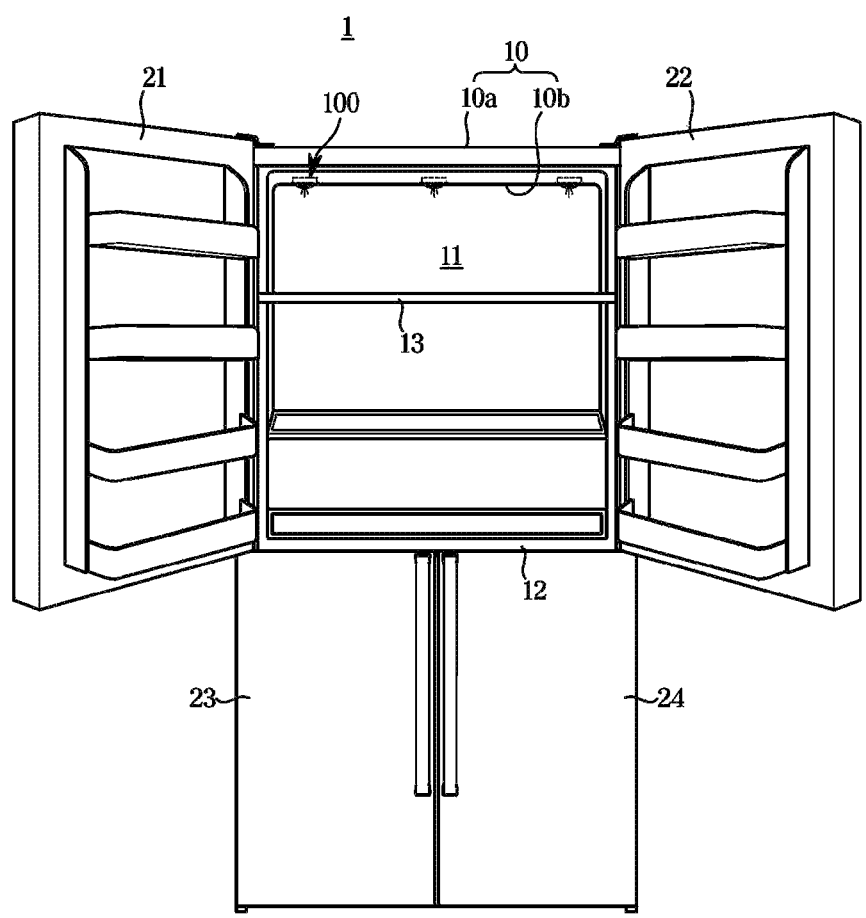
FIG. 1 is a view illustrating a refrigerator equipped with a lighting device according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

Hereinafter, embodiments of the present disclosure will be described in detail with reference to the accompanying drawings.

The terms 'front surface' and 'front' used below refer to directions directing to the 'front surface' and 'front' viewed from the front of a refrigerator 1 illustrated in FIG. 1, and the term 'rear' refers to a direction directing to the rear of the refrigerator 1.

Figure 2:
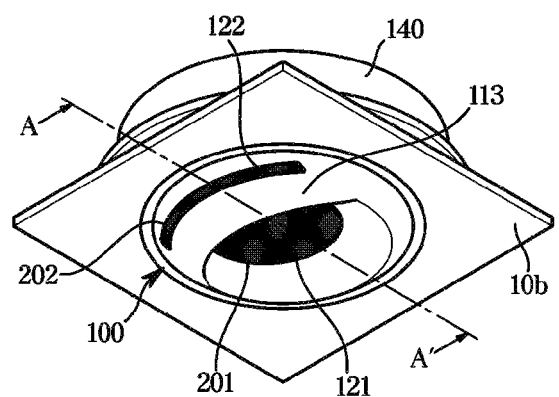
FIG. 2 is a perspective view of the lighting device according to an embodiment of the present disclosure.

FIG. 1 is a view illustrating a refrigerator equipped with a lighting device according to an embodiment of the present disclosure, and FIG. 2 is a perspective view of the lighting device according to an embodiment of the present disclosure.

As illustrated in FIGS. 1 and 2, the refrigerator 1 includes a main body 10, doors 21, 22, 23, and 24, a storage compartment 11 formed by the main body 10 and the doors 21, 22, 23, and 24, and a cold air supply device (not shown) to supply cold air to the storage compartment 11.

The main body 10 may be formed in a box shape with an open front, and the doors 21, 22, 23, and 14 open and close the open front of the main body 10. The storage compartment 11 may be partitioned from each other by a horizontal partition wall 11 and a vertical partition wall (not shown). The upper storage compartment 11 may be used as a refrigerating compartment, and a lower storage compartment (not shown) may be used as a freezing compartment.

In general, while the lower storage compartment maintains a temperature below zero and the upper storage compartment 11 maintains a relatively higher temperature than the lower storage compartment, food may be stored therein.

The cold air supply device is composed of a compressor, a condenser, an expansion valve, an evaporator, and a blowing fan, and may generate cold air through a cooling cycle and supply the cold air to the storage compartments.

The present embodiment illustrates a BMF type refrigerator (bottom mounted freezer type) having four doors, but the present disclosure is not limited thereto, and the present disclosure may be applied to various types of refrigerators, such as a top mounted freezer type (TMF type) refrigerator, a side by side type refrigerator, a French door type refrigerator, and a single-door type refrigerator.

The main body 10 includes an outer surface 10a forming an exterior from the outside and an inner surface 10b forming the storage compartment 11 in which food is stored, that is, a refrigerating compartment. A predetermined space is formed between the outer surface 10a and the inner surface 10b.

The upper storage compartment 11 may be opened and closed by the doors 21 and 22, and the lower storage compartment may be opened and closed by each of the doors 23 and 24. The doors 23 and 24 may be rotatably coupled to the main body 10.

A plurality of shelves 13 or drawers (not shown) may be disposed in the storage compartment 11 to store food.

A lighting device 100 configured to irradiate light may be installed in the storage compartment 11. The lighting device 100 may be installed in each of the upper storage compartment 11 and the lower storage compartment. An embodiment of the present disclosure illustrates that the lighting device is installed in the upper storage compartment 11, that is, a refrigerating compartment, but the present disclosure is not limited thereto. For example, the lighting device may be installed in the lower storage compartment.

The lighting device 100 may be operated when a user opens the doors 21, 22, 23, and 24. The lighting device 100 may be mounted on the inner surface 10b of the storage compartment 11. The lighting device 100 may be disposed on an upper surface of the storage compartment 11. A lighting device installation part 14 to install the lighting device 100 may be formed on the inner surface 10b of the storage compartment 11.

The lighting device 100 may include a light source 130 provided on the inner surface of the storage compartment 11 to provide light, and a lighting cover 110 provided to cover the light source 130.

The lighting device installation part 14 formed on the inner surface 10b of the storage compartment 11 may be formed in a size and shape corresponding to the lighting cover 110.

The lighting device 100 may include a lighting case 140 provided in a space between the inner surface 10b and the outer surface 10a of the storage compartment 11 to cover the light source 130, a transmission member 120, and the lighting cover 110. The lighting case 140 may be formed in a cap shape. The lighting case 140 forms an accommodation space 141 therein. The lighting case 140 is coupled to the outside of the inner surface 10b of the storage compartment 11 to prevent urethane from penetrating into the light source 130, the transmission member 120, and the lighting case 110.

Figure 3:
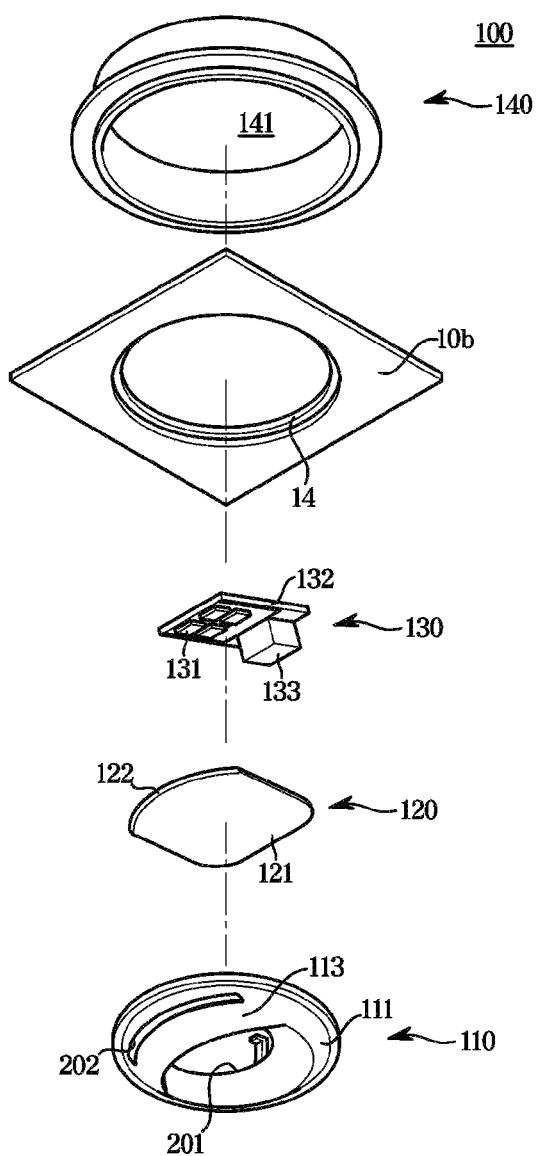
FIGS. 3 and 4 are exploded perspective views of the lighting device according to an embodiment of the present disclosure.
Figure 4:
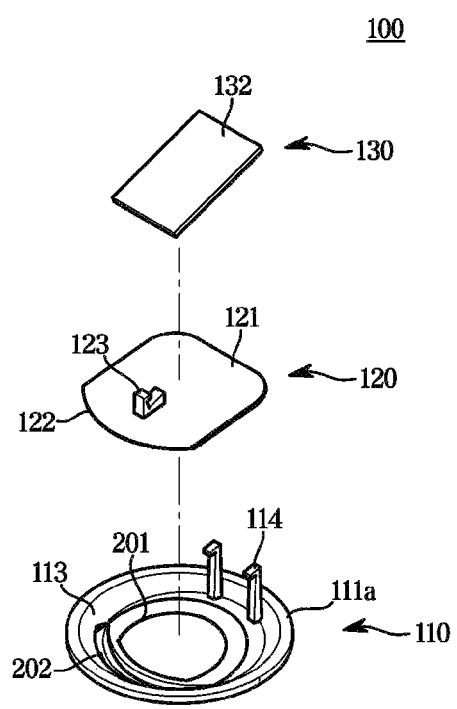
Figure 5:
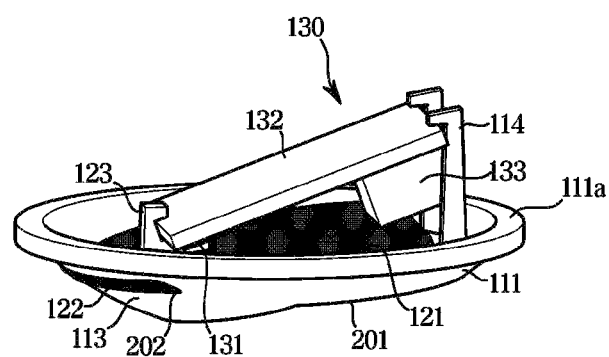
FIG. 5 is a view illustrating a lighting cover on which a light source is mounted according to an embodiment of the present disclosure.
Figure 6:
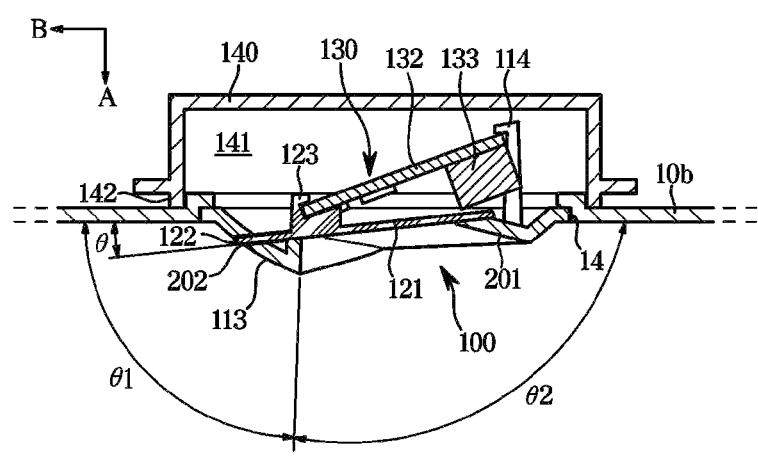
FIG. 6 is a cross-sectional view taken along line A-A' in FIG. 2, illustrating the lighting device according to an embodiment of the present disclosure.

FIGS. 3 and 4 are exploded perspective views of the lighting device according to an embodiment of the present disclosure, FIG. 5 is a view illustrating a lighting cover on which a light source is mounted according to an embodiment of the present disclosure, and FIG. 6 is a cross-sectional view taken along line A-A' in FIG. 2, illustrating the lighting device according to an embodiment of the present disclosure.

As illustrated in FIGS. 3 to 6, the lighting device 100 includes the light source 130, the lighting cover 110 provided to cover the light source 130, and the transmission member 120 disposed between the light source 130 and the lighting cover 110.

The lighting cover 110 may be formed in a circular shape. The lighting cover 110 may be formed in a hemispherical shape. The lighting cover 110 may include a cover body 111 formed in a hemispherical shape. A cover body installation part 111a having a size and shape corresponding to the lighting device installation part 14 of the storage compartment 11 may be provided on an upper edge of the cover body 111.

The lighting cover 110 may be installed by inserting and assembling the cover body installation part 111a into the lighting device installation part 14 on the inner surface 10b of the storage compartment 11. The lighting cover 110 may be provided such that at least a portion thereof protrudes from the inner surface 10b of the storage compartment 11.

The lighting cover 110 may include a material capable of recycling lights directing to a direction opposite to the inside direction of the refrigerator 1 on a path of light. The lighting cover 110 may include an opaque white colored polymer material with a high reflectivity. The lighting cover 110 may include a polymer material. The lighting cover 110 may be formed of a whole transmission material. The lighting cover 110 may include a diffusion material.

The lighting cover 110 may include a first opening 201 and a second opening 202 formed on the cover body 111. The first opening 201 may be formed such that light may be irradiated in a direction perpendicular to the inner surface 10b of the storage compartment 11. The first opening 201 may be formed in a circular shape at the center of the cover body 111. The first opening 201 may be formed such that light is irradiated downward from the upper surface of the storage compartment 11. The first opening 201 may be formed such that light is irradiated from an upper side to a lower side of the storage compartment 11, that is, in a first direction A. The second opening 202 may be formed such that light may be irradiated to the front of the storage compartment 11. The second opening 202 may be formed to be inclined at a predetermined angle θ with respect to the inner surface 10b of the storage compartment 11. The second opening 202 may be formed on a front surface of the cover body 111.

A blocking part 113 to block irradiation of light may be provided on at least a portion of the cover body 111. The blocking part 113 may be formed on the front surface of the cover body 111. The blocking part 113 of the cover body 111 may be provided to protrude from the inner surface 10b of the storage compartment 11.

The blocking part 113 may block light irradiated through the first opening 201 by covering at least a portion of the first opening 201. The blocking part 113 may be formed to be inclined toward the rear of the storage compartment 11 so that light is not irradiated to the front of the storage compartment 11. The second opening 202 may be formed on the blocking part 113. The second opening 202 may have a slit shape of extending long in a horizontal direction of the blocking part 113. The second opening 202 may be formed to be parallel to the inner surface 10b, that is, the upper surface of the storage compartment 11. An embodiment of the present disclosure illustrates that one of the second opening is formed in the horizontal direction of the blocking part, but the present disclosure is not limited thereto. For example, a plurality of the second openings may be formed.

The blocking part 113 may be integrally formed with the cover body 111. The blocking part 113 may be formed separately on the cover body 111. The blocking part 113 may be manufactured on the cover body 111 by a method such as double injection method of different materials, insert injection, fusion, and assembly.

The blocking part 113 may be formed of one or more layers on the cover body 111 formed of a whole transmission material or a diffusion material. The blocking part 113 may be manufactured on the cover body 111 formed of a whole transmission material or diffusion material through a method such as spray, ink, decoration film adhesion, and insert injection.

The blocking part 113 may be formed to be inclined at a first angle θ1 from the inner surface 10b of the storage compartment 11. The first angle θ1 may be formed to be greater than 0 degrees and less than or equal to 60 degrees.

The light source 130 includes at least one LED 131. The light source 130 may include a printed circuit board (PCB) 132 on which the at least one LED 131 is mounted. The light source 130 may include the LED 131 capable of implementing a white color or multiple colors.

Reference numeral 133, which is not described, denotes a connector for electrically connecting the printed circuit board.

The transmission member 120 is provided to transmit light of the light source 130 between the light source 130 and the lighting cover 110. The transmission member 120 is provided to cover the light source 130 between the light source 130 and the lighting cover 110. The transmission member 120 is formed to cover the first opening 201 and the second opening 202 of the lighting cover 110. The transmission member 120 is integrally formed to cover the first opening 201 and the second opening 202 of the lighting cover 110. The transmission member 120 is formed in a plate shape. The transmission member 120 may be formed of a material having a high reflectivity. The transmission member 120 may include a white colored polymer material. The transmission member 120 may include a whole transmission material. The transmission member 120 may include a diffusion material. The transmission member 120 may include a material capable of transmitting, diffusing, and totally reflecting light.

The transmission member 120 may be formed in a shape corresponding to the lighting cover 110. The transmission member 120 may be formed in a corresponding size and shape to cover the first opening 201 of the lighting cover 110. The transmission member 120 may be formed in a corresponding size and shape to cover the second opening 202 of the lighting cover 110. The transmission member 120 may include a first region 121 formed to correspond to the first opening 201 to cover the first opening 201, and a second region 122 disposed at an edge of the first region 121 and formed to correspond to the second opening 202 to cover the second opening 202. The first region 121 and the second region 122 of the transmission member 120 may be integrally formed.

An embodiment of the present disclosure illustrates that the transmission member 120 is provided separately from the lighting cover 110, but the present disclosure is not limited thereto. For example, the transmission member may be manufactured with the lighting cover by a method such as double injection of different materials, insert injection, fusion, and assembly.

The transmission member 120 may include a seating part 123 to support the light source 130. The seating part 123 may be formed on a portion of a rear surface of the transmission member 120. The seating part 123 is provided to support at least a portion of the printed circuit board 132 of the light source 130. The other portion of the printed circuit board 132 may be supported by a support part 114 formed on the lighting cover 110.

The LED 131 of the light source 130 is installed to face the rear of the storage compartment 11 so that the light source 130 of the lighting device 100 does not cause an unpleasant feeling to the user. The printed circuit board 132 on which the LED 131 is installed is disposed to face the rear of the storage compartment 11. It is appropriate that the seating part 123 on which one end of the printed circuit board 132 is supported is positioned lower than the support part 114 on which the other end thereof is supported. The seating part 123 of the transmission member 120 may be disposed in the front of the lighting cover 110. The support part 114 of the lighting cover 110 may be disposed in the rear thereof.

The first region 121 of the transmission member 120 covers the first opening 201 of the lighting cover 110, and irradiates light emitting from the light source 130 in the first direction A of the storage compartment 11, that is, to a lower side of the inside of the storage compartment 11 through the first opening 201 of the lighting cover 110.

The second region 122 of the transmission member 120 covers the second opening 202 of the lighting cover 110, and irradiates light from the light source 130 in a second direction B of the storage compartment 11, that is, to the front of the storage compartment 11 through the second opening 202. At this time, because the light emitted through the second opening 202 comes out through the second region 122 of the transmission member 120, the intensity thereof may be weaker than the light emitted through the first opening 201.

A part of light directing to the user is reflected and blocked by the blocking part 113 of the lighting cover 110 to reduce an unpleasant feeling of the user due to a hot spot or glare of the lighting.

In this case, a transmission region excluding the region reflected and blocked by the blocking part 113 may be formed at a second angle θ2. The transmission region, that is, the second angle θ2 may be formed to be greater than 0 degrees, and less than or equal to a region excluding the first angle θ1 at 180 degrees.

The user may check that the lighting is in an operating state by a part of light of the light source 130 passing through the second opening 202 of the lighting cover 110.

Figure 7:
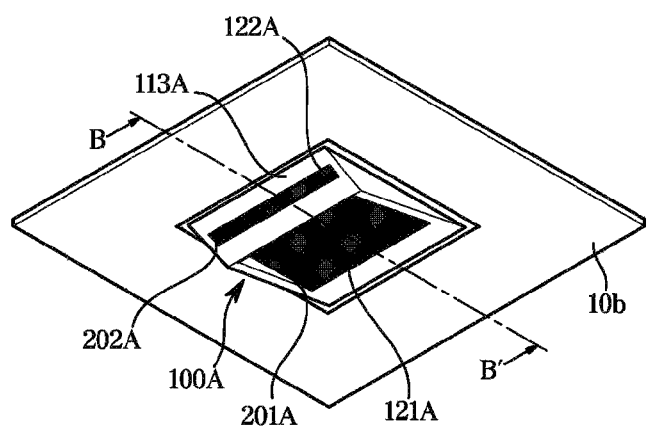
FIG. 7 is a perspective view of a lighting device according to another embodiment of the present disclosure.
Figure 8:
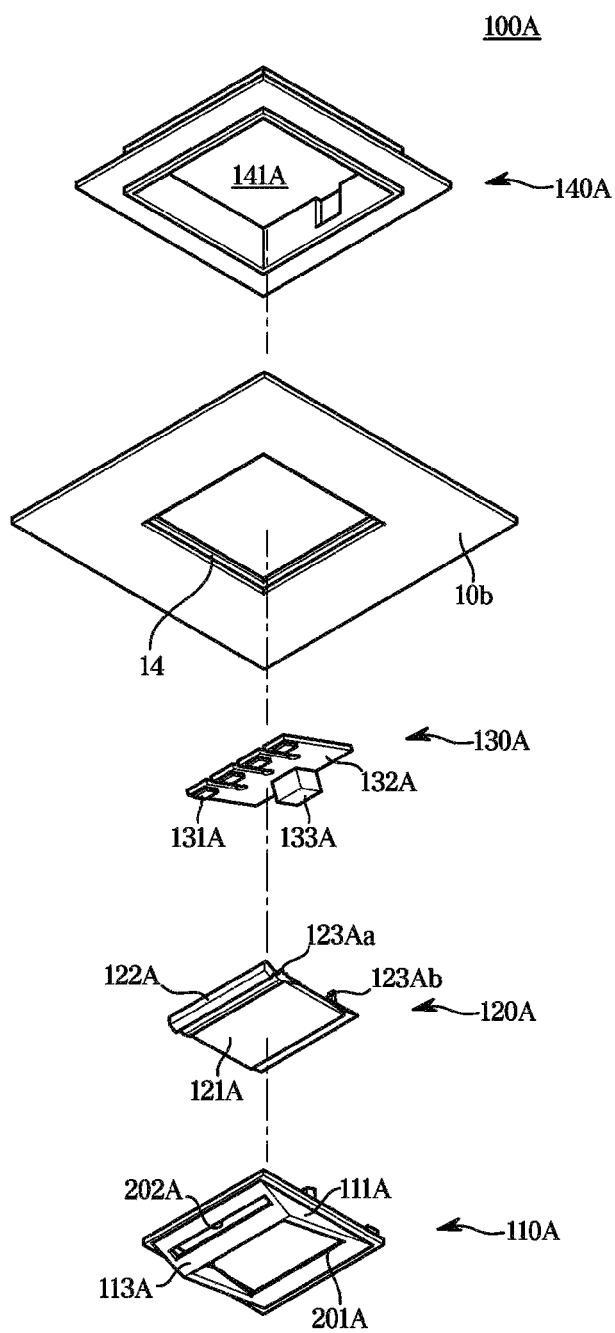
FIGS. 8 and 9 are exploded perspective views of the lighting device according to another embodiment of the present disclosure.
Figure 9:
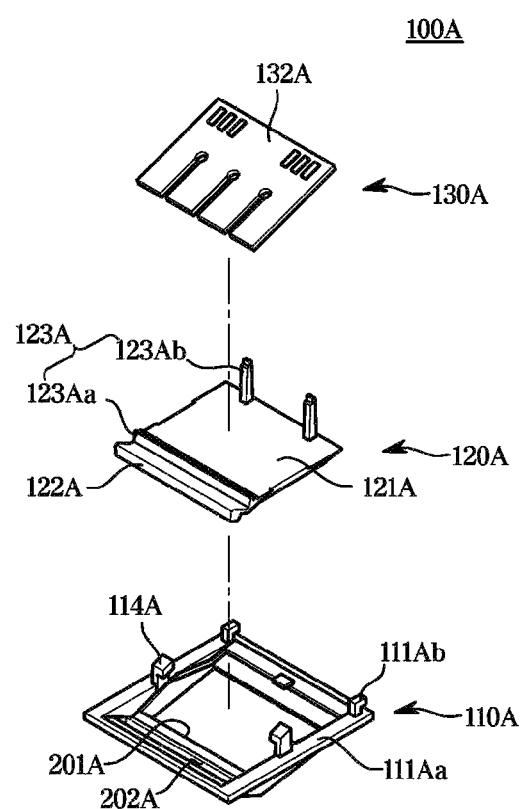
Figure 10:
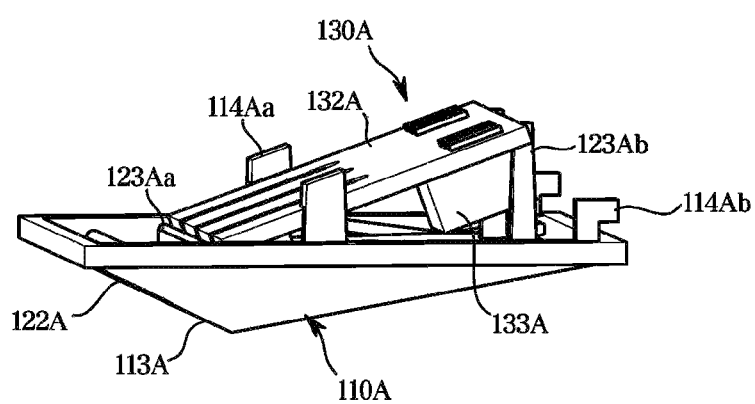
FIG. 10 is an exploded perspective view of a lighting cover on which a light source is mounted according to another embodiment of the present disclosure.
Figure 11:
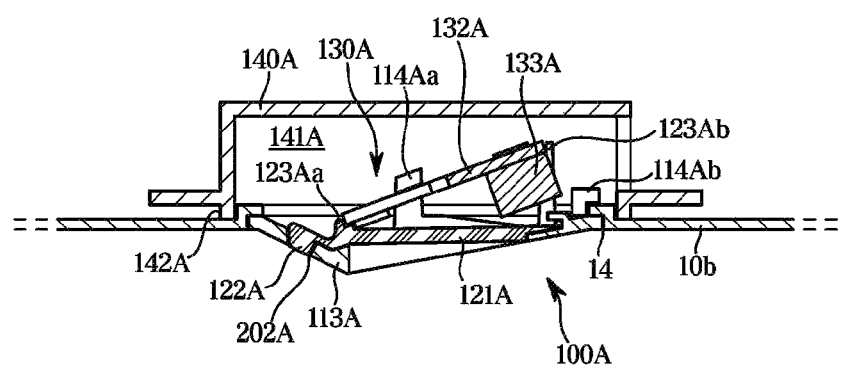
FIG. 11 is a cross-sectional view taken along line B-B' in FIG. 7, illustrating the lighting device according to another embodiment of the present disclosure.

FIG. 7 is a perspective view of a lighting device according to another embodiment of the present disclosure, FIGS. 8 and 9 are exploded perspective views of the lighting device according to another embodiment of the present disclosure, FIG. 10 is an exploded perspective view of a lighting cover on which a light source is mounted according to another embodiment of the present disclosure, and FIG. 11 is a cross-sectional view taken along line B-B' in FIG. 7, illustrating the lighting device according to another embodiment of the present disclosure. FIGS. 1 to 6 will be referred to for unillustrated reference numerals.

As illustrated in FIGS. 7 to 11, a lighting device 100A includes a light source 130A, a lighting cover 110A provided to cover the light source 130A, and a transmission member 120A disposed between the light source 130A and the lighting cover 110A.

The lighting cover 110A may be formed in a square shape. The lighting cover 110A may include a cover body 111A having a square shape. A cover body installation part 111Aa having a size and shape corresponding to the lighting device installation part 14 formed on an inner surface 10b of the storage compartment 11 may be provided on an upper edge of the cover body 111A.

The lighting cover 110A may include a coupling protrusion 111Ab to be coupled to the inner surface 10b of the storage compartment 11. The coupling protrusion 111Ab may be formed to protrude from the rear of the cover body installation part 111Aa. The coupling protrusion 111Ab is coupled to the lighting device installation part 14 so that the lighting cover 110A may be installed in the storage compartment 11.

The lighting cover 110A may include a material capable of recycling lights directing to a direction opposite to the inside direction of the refrigerator 1 on a path of light. The lighting cover 110A may include an opaque white colored polymer material with a high reflectivity. The lighting cover 110A may include a polymer material. The lighting cover 110A may be formed of a whole transmission material. The lighting cover 110A may include a diffusion material.

The lighting cover 110A may include a first opening 201A and a second opening 202A formed on the cover body 111A. The first opening 201A may be formed such that light may be irradiated in a direction perpendicular to the inner surface 10b of the storage compartment 11. The first opening 201A may be formed in a square shape at the center of the cover body 111A. The first opening 201A may be formed such that light is irradiated downward from the upper surface of the storage compartment 11. The first opening 201A may be formed such that light is irradiated from an upper side to a lower side of the storage compartment 11, that is, in the first direction A. The second opening 202A may be formed such that light may be irradiated to the front of the storage compartment 11. The second opening 202A may be formed to be inclined at the predetermined angle θ with respect to the inner surface 10b of the storage compartment 11. The second opening 202A may be formed on a front surface of the cover body 111A.

A blocking part 113B to block irradiation of light may be provided on at least a portion of the cover body 111A. The blocking part 113A may be formed on the front surface of the cover body 111A. The blocking part 113A may block light irradiated through the first opening 201A by covering at least a portion of the first opening 201A. The blocking part 113A may be formed to be inclined toward the rear of the storage compartment 11 so that light is not irradiated to the front of the storage compartment 11. The second opening 202A may be formed on the blocking part 113A. The second opening 202A may have a slit shape extending long in a horizontal direction of the blocking part 113A. The second opening 202A may be formed to be parallel to the inner surface 10b, that is, the upper surface of the storage compartment 11. The blocking part 113A may be formed to be inclined at the first angle θ1 from the inner surface 10b of the storage compartment 11. The first angle θ1 may be formed to be greater than 0 degrees and less than or equal to 60 degrees.

The light source 130A includes at least one LED 131A. The light source 130A may include a printed circuit board (PCB) 132A on which the at least one LED 131A is mounted. The light source 130A may include the LED 131A capable of implementing a white color or multiple colors.

The transmission member 120A is provided to transmit light of the light source 130A between the light source 130A and the lighting cover 110A. The transmission member 120A is provided to cover the light source 130A between the light source 130A and the lighting cover 110A. The transmission member 120A is formed to cover the first opening 201A and the second opening 202A of the lighting cover 110A. The transmission member 120A is integrally formed to cover the first opening 201A and the second opening 202A of the lighting cover 110A. The transmission member 120A is formed as a rectangular plate. The transmission member 120A may be formed of a material having a high reflectivity. The transmission member 120A may include a white colored polymer material. The transmission member 120A may include a whole transmission material. The transmission member 120A may include a diffusion material. The transmission member 120A may include a material capable of transmitting, diffusing, and totally reflecting light.

The transmission member 120A may be formed in a shape corresponding to the lighting cover 110A. The transmission member 120A may be formed in a corresponding size and shape to cover the first opening 201A of the lighting cover 110A. The transmission member 120A may be formed in a corresponding size and shape to cover the second opening 202A of the lighting cover 110A.

The transmission member 120A may include a first region 121A formed to correspond to the first opening 201A to cover the first opening 201A, and a second region 122A disposed at an edge of the first region 121A and formed to correspond to the second opening 202A to cover the second opening 202A. The first region 121A and the second region 122A of the transmission member 120A may be integrally formed.

The transmission member 120A may include a seating part 123A to support the light source 130A. The seating part 123A may be formed on an upper surface of the transmission member 120A. The seating part 123A is provided to support at least a portion of the printed circuit board 132A of the light source 130A. The seating part 123A may include a first seating part 123Aa provided to support one end of the printed circuit board 132A, and a second seating part 123Ab provided to support the other end of the printed circuit board 132A. The first seating part 123Aa may be disposed in the front of the upper surface of the transmission member 120A. The second seating part 123Ab may be disposed in the rear of the upper surface of the transmission member 120A. The second seating part 123Ab may be provided higher than the first seating part 123Aa. The second seating part 123Ab is positioned higher than the first seating part 123Aa to support a rear end of the printed circuit board 123A, so that the LED 131A mounted on the printed circuit board 132A may be disposed to face the rear of the storage compartment 11.

At least a portion of the printed circuit board 132A may be supported by a support part 114A formed on the lighting cover 110A. The support part 114A may be provided to stably support opposite side surfaces of the printed circuit board 123A.

The first region 121A of the transmission member 120A covers the first opening 201A of the lighting cover 110A, and irradiates light emitting from the light source 130A in the first direction A of the storage compartment 11, that is, to a lower side of the inside of the storage compartment 11 through the first opening 201A of the lighting cover 110A.

The second region 122A of the transmission member 120A covers the second opening 202A of the lighting cover 110A, and irradiates light emitting from the light source 130A in the second direction B of the storage compartment 11, that is, to the front of the storage compartment 11 through the second opening 202A.

At this time, because the light emitted through the second opening 202A comes out through the second region 122A of the transmission member 120A, the intensity thereof may be weaker than the light emitted through the first opening 201A.

The user may check that the lighting is in an operating state by a part of light of the light source 130A passing through the second opening 202A of the lighting cover 110A.

A part of light directing to the user is reflected and blocked by the blocking part 113A of the lighting cover 110A to reduce an unpleasant feeling of the user due to a hot spot or glare of the lighting.

Because a detailed configuration and operation of the lighting device 100A as described above are the same as those of the above embodiment, a redundant description will be omitted.

Figure 12:
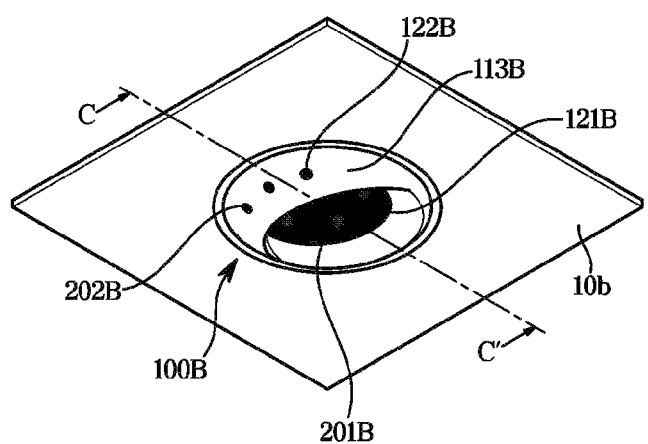
FIG. 12 is a perspective view of a lighting device according to another embodiment of the present disclosure.
Figure 13:
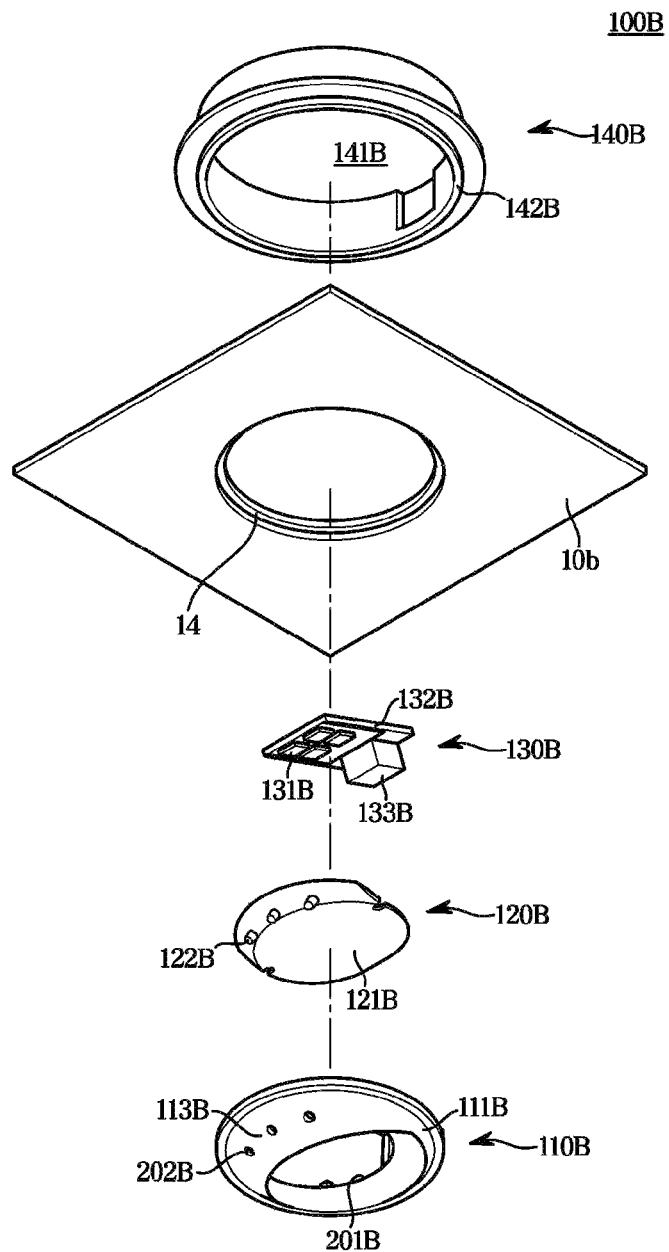
FIGS. 13 and 14 are exploded perspective views of the lighting device according to another embodiment of the present disclosure.
Figure 14:
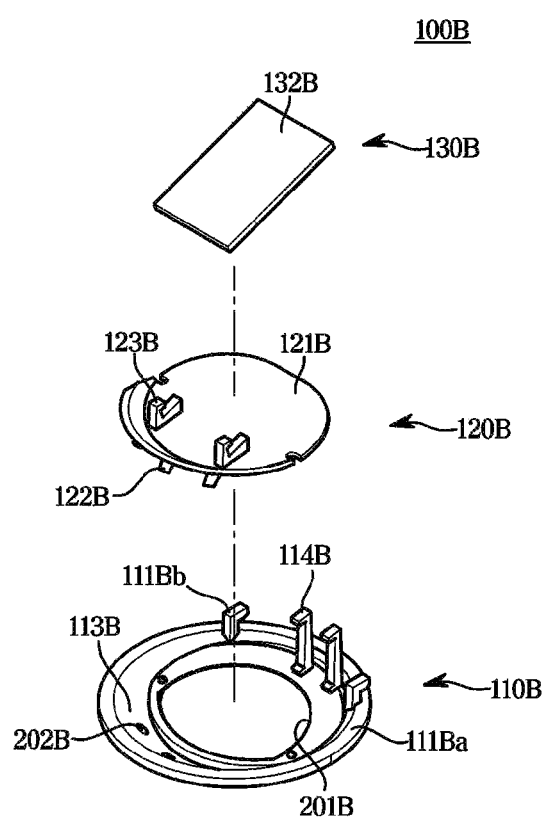
Figure 15:
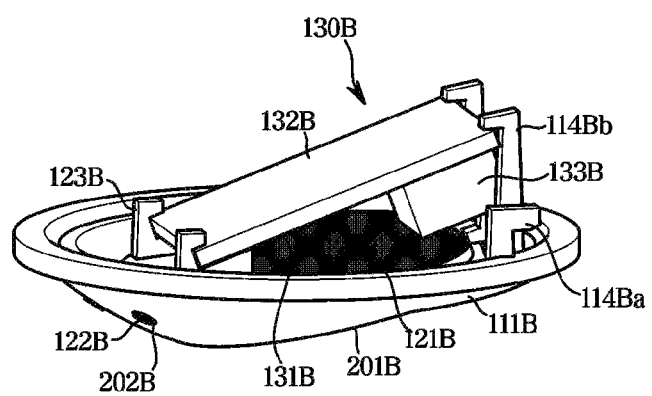
FIG. 15 is an exploded perspective view of a lighting cover on which a light source is mounted according to another embodiment of the present disclosure.
Figure 16:
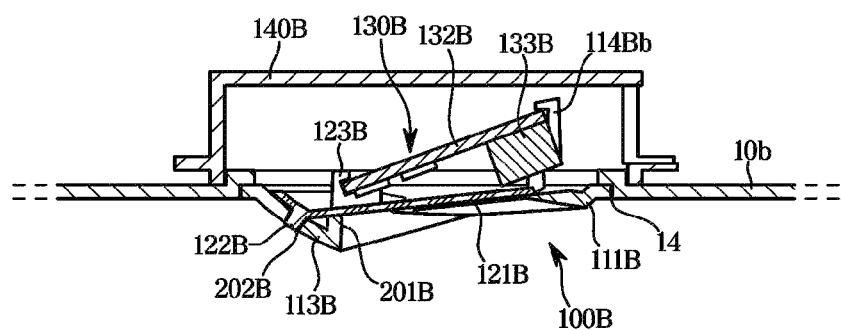
FIG. 16 is a cross-sectional view taken along line C-C' in FIG. 12, illustrating the lighting device according to another embodiment of the present disclosure.

FIG. 12 is a perspective view of a lighting device according to another embodiment of the present disclosure, FIGS. 13 and 14 are exploded perspective views of the lighting device according to another embodiment of the present disclosure, FIG. 15 is an exploded perspective view of a lighting cover on which a light source is mounted according to another embodiment of the present disclosure, and FIG. 16 is a cross-sectional view taken along line C-C' in FIG. 12, illustrating the lighting device according to another embodiment of the present disclosure. FIGS. 1 to 6 will be referred to for unillustrated reference numerals.

As illustrated in FIGS. 12 to 16, a lighting device 100B includes a light source 130B, a lighting cover 110B provided to cover the light source 130B, and a transmission member 120B disposed between the light source 130B and the lighting cover 110B.

The lighting cover 110B may be formed in a circular shape. The lighting cover 110B may be formed in a hemispherical shape. The lighting cover 110B may include a cover body 111B formed in a circular shape. A cover body installation part 111Ba having a size and shape corresponding to the lighting device installation part 14 formed on the inner surface 10b of the storage compartment 11 may be provided on an upper edge of the cover body 111B.

The lighting cover 110B may include a coupling protrusion 111Bb to be coupled to the inner surface 10b of the storage compartment 11. The coupling protrusion 111Bb may be formed to protrude from the cover body installation part 111Ba. The coupling protrusion 111Bb is coupled to the lighting device installation part 14 so that the lighting cover 110B may be installed in the storage compartment 11.

The lighting cover 110B may include a first opening 201B and a second opening 202B formed on the cover body 111B. The first opening 201B may be formed such that light may be irradiated in a direction perpendicular to the inner surface 10b of the storage compartment 11. The first opening 201B may be formed in a circular shape at the center of the cover body 111B. The first opening 201B may be formed such that light is irradiated downward from the upper surface of the storage compartment 11. The first opening 201B may be formed such that light is irradiated from an upper side to a lower side of the storage compartment 11, that is, in the first direction A. The second opening 202B may be formed such that light may be irradiated to the front of the storage compartment 11. The second opening 202B may be formed to be inclined at the predetermined angle θ with respect to the inner surface 10b of the storage compartment 11. The second opening 202B may be formed on a front surface of the cover body 111B.

A blocking part 113B to block irradiation of light may be provided on at least a portion of the cover body 111B. The blocking part 113B may be formed on the front surface of the cover body 111B. The blocking part 113B of the cover body 111B may be provided to protrude from the inner surface 10b of the storage compartment 11.

The blocking part 113B may block light irradiated through the first opening 201B by covering at least a portion of the first opening 201B. The blocking part 113B may be formed to be inclined toward the rear of the storage compartment 11 so that light is not irradiated to the front of the storage compartment 11. The second opening 202B may be formed on the blocking part 113B. The second opening 202B may have a hole shape formed to be spaced apart by a predetermined distance in a horizontal direction of the blocking part 113B. An embodiment of the present disclosure illustrates that three of the second openings 202B are formed, but the present disclosure is not limited thereto.

The light source 130B includes at least one LED 131B. The light source 130B may include a printed circuit board 132B on which the at least one LED 131B is mounted.

The transmission member 120B is provided to transmit light of the light source 130B between the light source 130B and the lighting cover 110B. The transmission member 120B is formed to cover the first opening 201B and the second opening 202B of the lighting cover 110B. The transmission member 120B is integrally formed to cover the first opening 201B and the second opening 202B of the lighting cover 110B. The transmission member 120B is formed as a circular plate. The transmission member 120B may be formed in a shape corresponding to the lighting cover 110B. The transmission member 120B may be formed in a corresponding size and shape to cover the first opening 201B of the lighting cover 110B. The transmission member 120B may be formed in a corresponding size and shape to cover the second opening 202B of the lighting cover 110B. The transmission member 120B may include a first region 121B formed to correspond to the first opening 201B to cover the first opening 201B, and a second region 122B disposed at a front edge of the first region 121B and formed to correspond to the second opening 202B to cover the second opening 202B. The first region 121B and the second region 122B of the transmission member 120B may be integrally formed.

The transmission member 120B may include a seating part 123B to support the light source 130B. The seating part 123B may be formed in the front of an upper surface of the transmission member 120B. The seating part 123B is provided to support at least a portion of the printed circuit board 132B of the light source 130B. The other portion of the printed circuit board 132B may be supported by a support part 114B formed on the lighting cover 110B.

It is appropriate that the seating part 123B on which one end of the printed circuit board 132B is supported is positioned lower than the support part 114B on which the other end thereof is supported. The first region 121B of the transmission member 120B covers the first opening 201B of the lighting cover 110B, and irradiates light emitting from the light source 130B in the first direction A of the storage compartment 11, that is, to a lower side of the inside of the storage compartment 11 through the first opening 201B of the lighting cover 110B.

The second region 122B of the transmission member 120B covers the second opening 202B of the lighting cover 110B, and irradiates light from the light source 130 in the second direction B of the storage compartment 11, that is, to the front of the storage compartment 11 through the second opening 202B. At this time, because the light emitted through the second opening 202B comes out through the second region 122B of the transmission member 120B, the intensity thereof may be weaker than the light emitted through the first opening 201B.

A part of light directing to the user is reflected and blocked by the blocking part 113B of the lighting cover 110B to reduce an unpleasant feeling of the user due to a hot spot or glare of the lighting.

The user may check that the lighting is in an operating state by a part of light passing through the second opening 202B of the lighting cover 110B.

Because a detailed configuration and operation of the lighting device 100B as described above are the same as those of the above embodiments, a redundant description will be omitted.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

The invention claimed is:

1. A refrigerator comprising:
a main body in which a storage compartment is formed;
a light source provided on an inner surface of the storage compartment to provide light;
a lighting cover provided to cover the light source; and
a transmission member provided to transmit light of the light source between the light source and the lighting cover,
wherein the transmission member comprises:
a first side facing the light source,
a second side opposite the first side, and
an edge formed between the first side and the second side,
wherein the lighting cover comprises:
a first opening formed to irradiate light in a direction perpendicular to the inner surface of the storage compartment and covered by the first side and the second side; and
a second opening formed to be inclined with respect to the inner surface so that light is irradiated to a front of the storage compartment and in which the edge is arranged.

2. The refrigerator according to claim 1, wherein the transmission member comprises at least one of an opaque white colored polymer material with a high reflectivity, a whole transmission material, and a diffusion material.

3. The refrigerator according to claim 1, wherein the transmission member comprises a material capable of transmitting, diffusing, and totally reflecting light.

4. The refrigerator according to claim 1, wherein the transmission member is formed with the lighting cover by at least one method of double injection of different materials, insert injection, and fusion.

5. The refrigerator according to claim 1, wherein:
the lighting cover comprises a blocking part protruding from an inner surface of the storage compartment so that the second opening is formed, and
the blocking part is formed to be inclined toward a rear of the storage compartment so that light is not irradiated to the front of the storage compartment.

6. The refrigerator according to claim 5, wherein the blocking part is formed on the lighting cover by at least one method of ink, decoration film adhesion, and insert injection.

7. The refrigerator according to claim 1, wherein the second opening comprises at least one of a slit and a hole.

8. The refrigerator according to claim 1, wherein one or more of the first and second openings are provided.

9. The refrigerator according to claim 1, wherein:
the light source comprises at least one LED and a printed circuit board (PCB) on which the at least one LED is mounted, and
at least a portion of the printed circuit board is seated on the transmission member.

10. The refrigerator according to claim 1, further comprising:
a lighting case coupled to the lighting cover or an outer side of the inner surface of the storage compartment to surround the light source and the transmission member.

* * * * *